United States Patent
Le Clere

(10) Patent No.: US 7,837,925 B2
(45) Date of Patent: Nov. 23, 2010

(54) METHOD FOR LASER DRILLING A COMPONENT MADE OF A CERAMIC MATRIX COMPOSITE, THE METHOD INCLUDING A STEP OF TREPANNING AND A STEP OF REMOVING SLAG BY ENLARGING THE LASER BEAM, HOLD OBTAINED BY THIS METHOD, COMPONENT MADE OF A CERAMIC MATRIX COMPOSITE CONTAINING IT, AND TURBOJET COMPRISING SUCH A COMPONENT

(75) Inventor: Philippe Le Clere, Vert St Denis (FR)

(73) Assignee: SNECMA, Paris (FR)

( * ) Notice: Subject to any disclaimer, the term of this patent is extended or adjusted under 35 U.S.C. 154(b) by 357 days.

(21) Appl. No.: 11/945,567

(22) Filed: Nov. 27, 2007

(65) Prior Publication Data

US 2008/0128952 A1   Jun. 5, 2008

(30) Foreign Application Priority Data

Nov. 30, 2006   (FR) ................... 06 55240

(51) Int. Cl.
  *B23K 26/38*   (2006.01)
  *F02C 7/00*   (2006.01)
(52) U.S. Cl. .................. 264/400; 264/482; 264/678; 219/121.71
(58) Field of Classification Search ........... 264/400, 264/482, 678; 219/121.72, 121.75, 121.7, 219/121.71

See application file for complete search history.

(56) References Cited

U.S. PATENT DOCUMENTS

| 5,593,606 A | * | 1/1997 | Owen et al. ............ 219/121.71 |
| 5,837,964 A | | 11/1998 | Emer et al. |
| 6,008,468 A | * | 12/1999 | Tanaka et al. .......... 219/121.71 |
| 6,441,341 B1 | | 8/2002 | Steibel et al. |
| 2002/0076541 A1 | * | 6/2002 | Jarmon et al. ............ 428/312.6 |
| 2002/0104831 A1 | | 8/2002 | Chang et al. |
| 2002/0170891 A1 | * | 11/2002 | Boyle et al. ............ 219/121.67 |
| 2003/0117449 A1 | | 6/2003 | Cahill et al. |

FOREIGN PATENT DOCUMENTS

EP   0 826 457 A1   3/1998

* cited by examiner

*Primary Examiner*—Matthew J. Daniels
(74) *Attorney, Agent, or Firm*—Oblon, Spivak, McClelland, Maier & Neustadt, L.L.P.

(57) ABSTRACT

A method of drilling holes in a component made of a ceramic matrix composite with a laser beam. The method includes: a percussion first step during which an initial hole having an initial diameter and a hole axis is drilled; a trepanning second step during which an intermediate hole, coaxial with the initial hole and having a larger diameter than that of the initial hole, is drilled by shifting the laser beam and then making it rotate about the hole axis; and a third step during which the focal point of the laser beam is moved along the hole axis and then pulses are triggered, to obtain a final hole.

10 Claims, 1 Drawing Sheet

METHOD FOR LASER DRILLING A COMPONENT MADE OF A CERAMIC MATRIX COMPOSITE, THE METHOD INCLUDING A STEP OF TREPANNING AND A STEP OF REMOVING SLAG BY ENLARGING THE LASER BEAM, HOLD OBTAINED BY THIS METHOD, COMPONENT MADE OF A CERAMIC MATRIX COMPOSITE CONTAINING IT, AND TURBOJET COMPRISING SUCH A COMPONENT

BACKGROUND OF THE INVENTION

The present invention relates to the technical field of the production of holes in a component made of a ceramic matrix composite by a laser drilling method. It also relates to the holes obtained by this method and also to a component made of a ceramic matrix composite having holes obtained by this method, such as for example a turbine blade or a combustion chamber wall. Finally, it relates to a turbojet comprising such a component.

DESCRIPTION OF THE PRIOR ART

It is known to use laser drilling techniques to produce holes in components, and especially to drill cooling holes in components intended for the hot parts of a turbojet, such as turbine blades or such as combustion chamber walls or support shells.

As is known, laser drilling techniques employ two types of operation, namely percussion and trepanning.

A percussion operation consists in using a fixed laser beam in pulsed mode to penetrate into the thickness of the material. This results in a hole the diameter of which is determined by the diameter of the laser beam and by the power level of the laser source.

A trepanning operation consists in cutting the outline of a hole by moving the laser beam over a circular path. This results in a hole the diameter of which is greater than the diameter of the laser beam.

It is also known to combine the two types of operation, starting the drilling with a percussion operation, so as to produce a first hole with a diameter approximately equal to that of the laser beam used, and then to carry out a trepanning operation around this first hole and to increase the cross section of drilled material so as to produce a second hole the diameter of which is larger than that of the laser beam used.

The person skilled in the art is faced with a technical problem when producing a hole using a trepanning operation, since the hole obtained generally has slag on the walls of the hole and/or at the exit of the hole. The presence of such slag has the drawback that the hole geometry is not guaranteed. In other words, it is not possible to reliably ensure repeatability of the diameter of the holes obtained by this trepanning operation. Consequently, it is not possible to reliably guarantee a flow of air passing through the holes obtained in this manner, which is prejudicial when the holes are holes for cooling a component.

Document U.S. Pat. No. 5,837,964 describes a method of laser drilling a component made of a superalloy, which carries out a percussion operation and a trepanning operation. In the event of slag being present in the holes obtained during the trepanning operation, it is proposed to repeat the percussion operation and then the trepanning operation a sufficient number of times until a hole having the predetermined diameter and extending uniformly into the drilled thickness of the superalloy is obtained.

In recent years the trend is to produce components made of ceramic matrix composites (CMCs) rather than made of refractory metal alloys. CMCs have the advantage of being lighter than metallic materials. CMCs are thermostructural materials, that is to say they have good mechanical properties and the capability of retaining these mechanical properties at elevated temperature. These materials comprise a fibrous reinforcement formed from refractory fibers (generally carbon fibers or ceramic fibers) and densified by a ceramic matrix or by a carbon/ceramic hybrid matrix.

When CMCs are used to produce components intended for the hot parts of turbojets, it is necessary to produce holes for the passage of cooling air in the same way as in components produced from a refractory metal alloy.

When laser drilling is applied to CMCs, it has the drawback of baring internal structures of these materials. There is then the risk of ambient oxygen reaching this internal structure and oxidizing the surface of the CMC. This drawback has been overcome by using what are called "self-healing" CMCs, that is to say those capable, at the use temperature of the material, of passing into a viscous state that is sufficiently fluid to block the ambient oxygen. A protective layer, such as for example one made of SiC/Si—B—C, is created.

The laser drilling method employed in document U.S. Pat. No. 5,837,964 cannot be used for drilling a CMC, even if this were a self-healing CMC. This is because repeating the percussion and trepanning operations would result in substantial heating of the CMC and would cause it to degrade by delamination.

Document U.S. Pat. No. 6,441,341 discloses a method of drilling holes in components intended for the hot turbojet sections made of CMC, the CMC having at least one oxidizable component. The method consists in producing these holes by laser drilling, while heating the constituent material of the matrix so as to oxidize it and form a silica. This silica is exposed to appropriate temperatures, which heat it and make it melt. It is then rapidly solidified before flowing into the holes. This rapid controlled solidification of the silica makes it possible to obtain holes with a smooth slag-free wall and to create an oxidation barrier for preventing any future oxidation during operation of the turbojet. This laser drilling method has the advantage of not creating slag, but has the drawback of being limited to CMCs having at least one oxidizable component.

Document EP 0 826 457 discloses a method of laser drilling a turbine blade having a substrate made of a superalloy, a tie layer and a thermal barrier in the form of a ceramic coating. A first hole is drilled in percussion mode by focusing the laser beam onto the surface of the component. The laser beam is then refocused by being moved away from the component, so as to drill a second hole in pulsed percussion mode, this second hole being coaxial with the first hole and of larger diameter than the first hole, and of smaller depth. The presence of the smaller-diameter first hole allows the molten material to be removed while the second hole is being drilled. The method described in that document is not suitable for drilling a component made entirely of CMC.

SUMMARY OF THE INVENTION

The object of the present invention is to remedy the above-mentioned drawbacks. It proposes a method of laser drilling holes in CMC (ceramic matrix composite) components intended in particular for the hot parts of a turbojet, the method comprising a percussion operation, a trepanning operation and an operation for removing the slag created during this trepanning operation.

According to a first aspect, the invention relates to a method of drilling holes in a component made of a ceramic matrix composite by means of a laser beam, which comprises:

- a percussion first operation during which an initial hole having an initial diameter and a hole axis is drilled by focusing the laser beam in the thickness of the component to be drilled;
- a trepanning second operation during which an intermediate hole, coaxial with the initial hole and having a larger diameter than that of the initial hole is drilled by shifting the laser beam and then making it rotate about the hole axis; and
- a third operation during which the focal point of the laser beam is moved along the hole axis and then pulses are triggered, to obtain a final hole.

According to one method of implementation, the focal point of the laser beam is moved, by moving it away from the position that it occupies during the first and second operations.

According to another method of implementation, the focal point of the laser beam is moved, by bringing it closer to the position that it occupies during the first and second operations.

The term defocusing refers to the action of moving the focal point of the laser beam along the axis of the hole.

The technical effect obtained by these laser pulses is that the slag that may be created during the trepanning operation is removed by these pulses emanating from the defocused laser beam along the axis of the hole during the third operation.

According to a second aspect, the invention relates to a hole in a CMC component, which is obtained by the method according to the first aspect. In one method of implementation, the hole is oriented along an axis perpendicular to the surface of said component. In another method of implementation, the hole is oriented along an axis inclined to the surface of said component.

According to a third aspect, the invention relates to a CMC component which includes at least one hole obtained by the method according to the first aspect. In an exemplary embodiment, this component is a combustion chamber wall. According to another embodiment, this component is a turbine blade.

According to a fourth aspect, the invention relates to a turbojet that includes at least one component according to the third aspect.

One advantage of the method according to the invention lies in the fact that it can be applied to CMCs that do not possess an oxidizable component.

Another advantage of the method according to the invention lies in the fact that the few defocused pulses do not have the effect of degrading the CMC by delamination or another effect due to the heat.

BRIEF DESCRIPTION OF THE DRAWINGS

The invention will be more clearly understood upon reading the following detailed description of one particular embodiment, provided by way of indication and implying no limitation, and illustrated by means of the appended drawings in which.

DESCRIPTION OF THE PREFERRED EMBODIMENTS

All the figures show a portion 10 of the surface of a CMC component, and also two perpendicular axes 12, 14 of the plane of this portion 10. The method according to the invention is to drill a final hole centered on an axis 16 perpendicular to the two axes 12 and 14. The elements 10, 12, 14, 16 are common to FIGS. 1 to 5.

The method according to the invention employs a conventional laser system, provided with a laser source that emits a laser beam.

Figure 1:
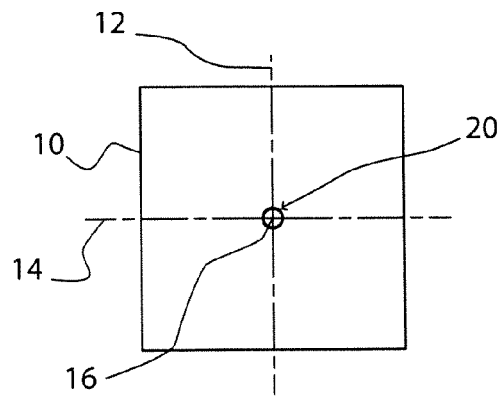
FIG. 1 illustrates, schematically, the first operation of the method and an initial hole thus obtained.

Referring firstly to FIG. 1, this shows an initial hole 20 obtained by a percussion operation carried out using a laser beam. The laser beam is focused in the thickness of the component to be drilled, so that the diameter of this initial hole 20 is approximately equal to the diameter of the laser beam. The initial hole 20 is centered on the axis 16.

Figure 2:
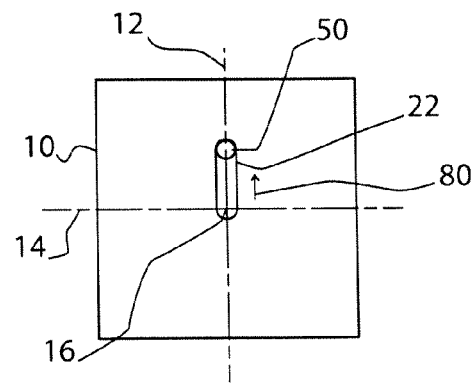
FIG. 2 illustrates, schematically, one step of the second operation of the method and a first intermediate hole.

Referring to FIG. 2, this shows a first intermediate hole 22 obtained after a first step of a trepanning operation carried out by means of the laser beam. The laser beam has been moved in a plane approximately perpendicular to the plane of the hole, along a straight path represented by the arrow 80 in FIG. 2. The laser beam is then in the position identified by the mark 50. The first intermediate hole 22 is an oblong hole, the length of which is approximately equal to the distance the laser beam has moved and the width of which is approximately equal to the diameter of the laser beam.

Figure 3:
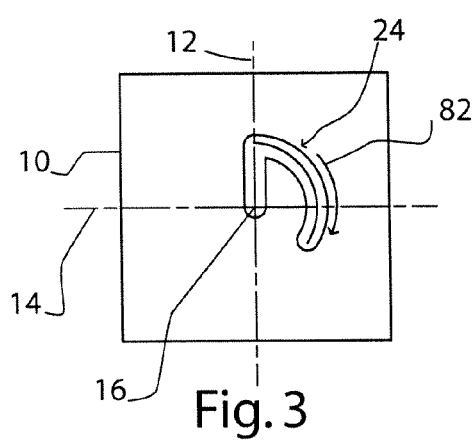
FIG. 3 illustrates, schematically, another step of the second operation of the method and a second intermediate hole.

Referring to FIG. 3, this shows a second intermediate hole 24 obtained during a second step of a trepanning operation carried out by means of the laser beam. The laser beam has been moved in the same plane as previously, along a circular path represented by the arrow 82 in FIG. 3. In this step, the path traveled corresponds to a portion of a circle.

Figure 4:
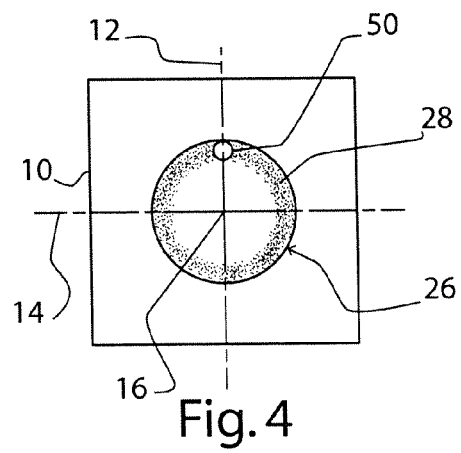
FIG. 4 illustrates, schematically, a third intermediate hole obtained after the second operation of the method.

Referring to FIG. 4, this shows a third intermediate hole 26 obtained after the trepanning operation carried out by means of the laser beam. The laser beam has continued to be moved along the circular path represented by the arrow 82 in FIG. 3, until a complete circle has been traveled. The laser beam is then back in the position identified by the mark 50. The third intermediate hole 26 has a diameter approximately equal to the diameter of the circular path traveled by the laser beam. In practice, the length of the straight path 80 illustrated in FIG. 2 is controlled so as to obtain a third intermediate hole 26 having the desired diameter.

However, slag 28 attached to the walls and/or to the exit of the hole 26 thus obtained is observed. This is inherent in the trepanning operation. It disturbs the uniformity of the diameter of the hole 26, to the point that the flow of air passing through this hole 26 cannot be known precisely. In certain applications, it is desirable for the flow of air passing through the holes to be known precisely, and to be reproducible from one hole to another. This is why it proves to be necessary to eliminate this slag, so as to obtain final holes the diameter of which is controlled. This makes it possible for the individual effective cross section of a set of neighboring holes to be uniform and for all of the drilled holes to have uniform permeability.

Figure 5:
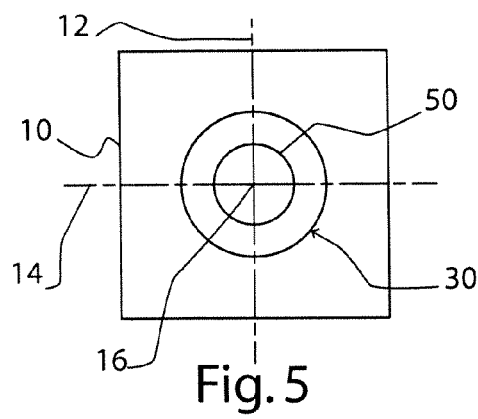
FIG. 5 illustrates, schematically, a final hole obtained after the third operation of the method.

The third operation of the method according to the invention has the effect of eliminating the slag 28 that is present. This is illustrated in FIG. 5.

During this third operation, a first step is carried out during which the laser beam is returned to its initial position, that is to say to the position identified by the mark 20 in FIG. 1. This position is centered on the axis 16.

During the third operation, a second step is carried out during which the focal point of the laser beam is moved along the axis of the hole, that is to say along the axis 16. According to a preferred method of implementation, the focal point is shifted slightly away from the surface portion 10. According to another method of implementation, the focal point is brought slightly closer to the surface portion 10. This movement of the focal point has the effect of slightly modifying the diameter of the laser beam at the surface portion 10, more precisely of slightly enlarging it. After the focal point has been moved along the axis 16, the position of the laser beam is identified by the mark 50 in FIG. 5.

During the third operation, a third step is carried out during which a few laser pulses, preferably 1 to 5 pulses, are triggered. This third step has the effect of destroying the slag 28 present on the inside of the third intermediate hole 26 and of obtaining a final hole 30, the walls of which are clean. As may be seen in FIG. 5, the diameter of the final hole 30 is uniform and controlled. It is also constant along the thickness of the drilled component.

To carry out the third operation of the method, it is not necessary for the energy of the laser beam to be higher than that employed during the preceding first and second operations, since the actual drilling has already taken place, and it is sufficient to have an energy capable of cleaning the third intermediate hole 26 of its slag 28.

Figure 6:
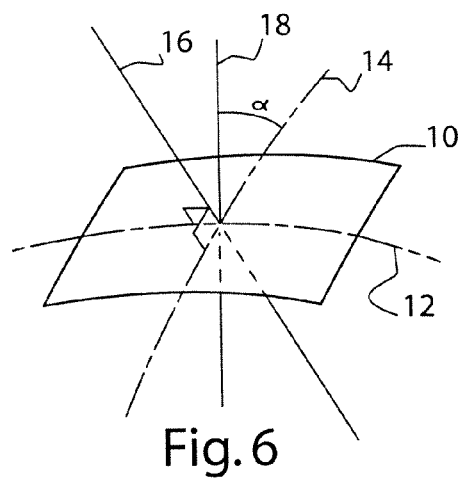
FIG. 6 shows, in schematic perspective, the possible orientations of holes obtained by the method.

A method for producing final holes 30 having a hole axis 16 that is perpendicular to the surface portion 10 of a component in which the hole 30 is drilled has just been described with reference to FIGS. 1 to 4. The method is also applicable to the production of holes 30 having a hole axis 18 that is not perpendicular to the surface portion 10, but is inclined at an angle α to this surface portion 10, as illustrated in FIG. 6. To carry out the method of the invention, the laser system is installed in such a way that the laser beam is not directed along the direction 16, but along the direction 18, this direction 18 having the desired inclination to the surface portion 10. Depending on the desired applications, the angle α is between 20° and 40°, for example approximately equal to 30°.

The method that has just been described with reference to FIGS. 1 to 6 is particularly useful when it is desired to drill holes having a diameter larger than the diameter of the laser beam available. For example, by implementing this method it is possible to produce final holes with a diameter of 0.8 mm or 0.9 mm, or 1.0 mm, using a laser beam having a primary diameter of 0.7 mm.

The parameters of an implementation example, with an instrument of the LASER SLAB YAG 1064 nm type of the MLS P1000 brand, sold by the company Munich Laser System, are the following:

diameter of the laser beam: 0.5 mm
First Operation: Percussion
pulse duration: 2 ms
pulse frequency: 12 Hz
pulse power: 17 J
number of pulses: 5
Second Operation:
linear displacement: 0.8 mm
pulse duration: 1.5 ms
pulse frequency: 14.8 Hz
pulse power: 14 J
cutting speed: 15 mm/min
Third Operation:
focal point shift: 3 mm
pulse duration: 2 ms
pulse frequency: 12 Hz
pulse power: 17 J
number of pulses: 5

The invention claimed is:

1. A method of drilling holes in a component made of a ceramic matrix composite with a laser beam, wherein said method comprises:
    a percussion first step during which an initial hole, having an initial diameter and a hole axis, is drilled by focusing the laser beam in the thickness of the component to be drilled;
    a trepanning second step during which an intermediate hole, coaxial with the initial hole and having a larger diameter than that of the initial hole, is drilled by shifting the laser beam and then making the laser beam rotate about the hole axis; and
    a third step during which the laser beam is centered on the initial hole axis and enlarged within said intermediate hole from a first diameter smaller than said intermediate hole to a second diameter reaching slag present on an inside of the intermediate hole and wherein pulses of the enlarged laser beam are triggered during said third step so as to destroy said slag with said pulses to obtain a final hole.

2. The method as claimed in claim 1, wherein the number of pulses during said third step is between 1 and 5.

3. The method as claimed in claim 1, wherein during said third step the focal point of the laser beam is moved, by moving the focal point away from the position that the focal point occupies during the first and second steps.

4. The method as claimed in claim 1, wherein the focal point of the laser beam is moved during the third step by bringing the focal point closer to the position that the focal point occupies during the first and second steps.

5. The method as claimed in claim 1, wherein the hole is oriented along an axis perpendicular to the surface of said component.

6. The method as claimed in claim 1, wherein the hole is oriented along an axis inclined to the surface of said component.

7. The method as claimed in claim 6, wherein the hole is inclined at an angle (α) of between 20° and 40° to the surface of said component.

8. The method as claimed in claim 7, wherein the hole is inclined by an angle (α) of approximately 30° to the surface of said component.

9. The method as claimed in claim 1, applied to a CMC component of a turbojet.

10. The method as claimed in claim 1, wherein said laser beam has a pulse power during said third step when destroying said slag that is substantially equal to a pulse power used to drill said component during said percussion first step.

* * * * *

UNITED STATES PATENT AND TRADEMARK OFFICE
CERTIFICATE OF CORRECTION

PATENT NO. : 7,837,925 B2  Page 1 of 1
APPLICATION NO. : 11/945567
DATED : November 23, 2010
INVENTOR(S) : Philippe Le Clere It is certified that error appears in the above-identified patent and that said Letters Patent is hereby corrected as shown below:

In the Title at (54), line 6, change "HOLD" to --HOLE--.

In column 1, line 6, change "HOLD" to --HOLE--.

Signed and Sealed this
Twenty-sixth Day of July, 2011

David J. Kappos
*Director of the United States Patent and Trademark Office*